(12) United States Patent
Koch

(10) Patent No.: US 7,201,845 B1
(45) Date of Patent: Apr. 10, 2007

(54) SYSTEM FOR INSERTING AND REMOVING FRAMES OF A FLUID TRANSFER SYSTEM

(75) Inventor: William F. Koch, Auburn, ME (US)

(73) Assignee: Bachmann Industries, Inc., Auburn, ME (US)

(*) Notice: Subject to any disclaimer, the term of this patent is extended or adjusted under 35 U.S.C. 154(b) by 222 days.

(21) Appl. No.: 10/796,453

(22) Filed: Mar. 8, 2004

(51) Int. Cl.
*B01D 29/09* (2006.01)
*B01D 25/19* (2006.01)
*B01D 46/42* (2006.01)

(52) U.S. Cl. ............... 210/236; 210/227; 210/228; 210/230; 210/231; 210/359; 210/398; 210/399; 210/447; 55/483; 55/490; 55/492; 55/493; 422/168

(58) Field of Classification Search ............... 210/224, 210/227, 288, 230, 231, 236, 323.1, 324, 210/359, 398, 399, 447, 455; 55/483, 490, 55/492, 493; 422/168
See application file for complete search history.

(56) References Cited

U.S. PATENT DOCUMENTS

| | | | | |
|---|---|---|---|---|
| 1,928,163 A | * | 9/1933 | Barnard | 210/667 |
| 3,826,374 A | * | 7/1974 | Busse et al. | 210/225 |
| 4,025,434 A | * | 5/1977 | Mladota | 210/236 |
| 4,362,617 A | * | 12/1982 | Klepper | 210/225 |
| 5,055,205 A | * | 10/1991 | White | 210/784 |
| 5,192,434 A | * | 3/1993 | Moller | 210/227 |
| 5,567,327 A | * | 10/1996 | De Haan et al. | 210/768 |
| 6,116,264 A | | 9/2000 | Bachmann | |
| 6,571,420 B1 | | 6/2003 | Healy et al. | |

* cited by examiner

*Primary Examiner*—John Kim
(74) *Attorney, Agent, or Firm*—Vermill Dana, LLP; Chris A. Caseiro (57) ABSTRACT

A system for moving a filter or a retainer into or out of a fluid pathway without halting the movement of the fluid in the pathway. When acting as a filtering device, the system includes a filter frame and a drive mechanism for slidingly moving the filter frame on stationary rails that remain in the duct through which the fluid is transferred. When a retainer device, the system includes a retainer and a drive mechanism for slidingly moving retainer on stationary rails that remain in the chamber through which a fluid under treatment passes. The system includes isolation means permitting the filter frame or retainer to pass into or out of the duct or chamber without exhausting the fluid within the duct or chamber. The drive mechanism may be a guillotine damper gate drive, a spindled drive, a hydraulic actuator or other drive means. The filter or the retainer may include a plurality of bays that are rigidly, hingedly, or detachably connected together. The system may be used in the fluid pathways of power generation systems, including Selective Catalyst Reduction (SCR) reactors, but is not limited thereto.

20 Claims, 6 Drawing Sheets

SYSTEM FOR INSERTING AND REMOVING FRAMES OF A FLUID TRANSFER SYSTEM

BACKGROUND OF THE INVENTION

1. Field of the Invention

The present invention relates to filtration and retention screens positioned in fluid pathways. More particularly, the present invention relates to means for removing and re-inserting such screens from or into the fluid pathway without halting the process generating, treating or using the fluid. The present invention relates to retractable material retaining screens.

2. Description of the Prior Art

Effective fluid flow transfer is an important aspect of many industrial processes. In the power generation industry in particular, the effective transfer of significant volumes of fluids impacts power generation productivity and the environment. Devices designed to ensure that such fluids move from one portion of the power generation plant to another when desired aid in maximizing productivity and minimizing adverse environmental impact. However, as power generation facilities and systems increase in size, the task of fluid diversion devices becomes increasingly harder.

It is well known in the power generation industry that boilers are employed to produce steam at high temperature and pressure. That steam is used to move turbines coupled to generators. Combustible fuels such as coal, oil, gas, etc., are used to produce the heat necessary to generate the steam. Products of that fuel combustion exit the boiler at high temperatures and can include a variety of byproducts, including particulate matter, dependent upon the type of fuel. The high-temperature combustion products exiting the boiler may be exhausted to the atmosphere through a stack, transferred to various filtration and scrubbing systems, or both in alternation under a schedule or as conditions warrant. In some instances, Selective Catalytic Reduction (SCR) reactors are used with fossil fuel-fired boilers to reduce nitrogen oxide (NOx) emissions generated in the combustion process. These reactors are normally installed downstream of the boiler, upstream of air preheaters.

Fly ash, one form of the particulate matter generated in the combustion process, may be a substantial and undesirable byproduct. This particulate matter is generally transferred with the combustion gas through one or more components of the power generation system but efforts are made to remove the fly ash to the greatest extent possible in order to maximize process efficiency and to meet governmental emission requirements. Filter devices are employed for that purpose. In the context of the present invention, a filter is to be understood to include any mechanism configured to allow a fluid to pass there through while blocking the passage of particulate matter. The size of the particulate matter blocked is dependent upon the size of the openings of the filter mechanism and the angle of impingement. A filter may be a filter as generally understood, or a screen, either of which may be a metallic or nonmetallic mesh, weave, knit, spun material, or fabric.

In addition to filters used to filter out particulate from the fluid pathway, the SCR reactors are used to remove certain gases from the boiler flue gas. SCR reactors include one or more layers of catalyst beds to facilitate removal of the NOx emissions. During NOx removal, a reagent, such as ammonia gas or a suitable equivalent, is injected with the flue gas into the SCR reactor vessel. Two types of catalyst beds of defined geometry are generally used in the SCR reactor. The two types typically used are: 1) honeycomb-type (or grid-type) and 2) plate-type. Either of the two catalyst beds is normally assembled into standard commercial-size modules to facilitate loading and handling in approximately half-meter or one-meter increments per layer. The catalyst is suspended within the SCR reactor, ordinarily in a plurality of layers, with the catalyst installed one-half to one-meter in depth per layer.

In an exemplar processing operation, the flue gas enters the SCR's first catalyst layer at a velocity of about 8–20 feet per second. The flue gas passes through holes (honeycomb-type) or slots (plate-type) in the first catalyst layer, exits the first catalyst layer, enters the second catalyst layer, and so on. Holes or slots (also known as hydraulic diameter or pitch opening) in the catalyst layer are normally about 3 mm to 8 mm, closely spaced. In this manner, 70% to 95% of the catalyst layer surface is open to passage of flue gas through it.

Fly ash particle size distribution and particle sizes are highly dependent on the nature of fuel burned and boiler process conditions. In general however, fly ash particles entering the SCR reactor can range in size from about 0.01 mm to about 3 mm in diameter. However, these particles do agglomerate with each other causing particle sizes of 1 cm or larger to form what is often referred to as popcorn ash. Particles larger in size than the available catalyst pitch opening, cannot traverse through the catalyst layer, hence these particles collect and continue to build up upstream of the catalyst layer. Moreover, particles nearly equal in size to catalyst hydraulic diameter often lodge inside the catalyst in the holes or slots. Filters upstream of the SCR reactor reduce particulate accumulation in the catalyst beds, but such accumulation does occur in the filters. While filtration can be achieved by capture of the particles within the filter, a more effective method involves impingement of the particles against a screen and subsequent deflection of the particles into an appropriate receiver.

The agglomeration of particles, whether at the filter, the SCR catalyst beds, or both, can have a significant adverse impact on the efficiency of the SCR reactor and/or the power generation system. Specifically, the effective fluid pass through area is reduced, increasing pressure drops throughout the system. In the SCR reactor, particulate accumulation reduces the reaction zone of the SCR reactor and so the reaction time is diminished. This naturally affects the entire energy generation system in an adverse way and so it is undesirable to have a build up of particles in the SCR reactor in particular, and throughout the system fluid pathway in general. Since power generation systems, particularly those including SCR reactors, are designed in fine balance, it is important that all subsystems operate substantially as designed. When the operating conditions change, the balance of the entire reaction process and therefore the power generation can be altered adversely. In sum, there is a fine balance in the system and plugging of the fluid pathway, the SCR reactor, or both, throws that balance off.

During the filtering/screening process, certain areas of the filter will be plugged by the particulate. This plugging will result in increased pressure losses through the filtering media and increased velocities in the remaining open areas. The increased pressure losses will result in reduced efficiencies in the system and higher operating costs. The increased velocity of the flow through the open area will result in elevated erosion rates in those open areas, resulting in eventual failure of the abraded region. Repair or replacement of the damaged regions currently require shutdown of the process.

Presently, there are two methods for removing particulate buildup on filters and for cleaning catalyst beds of SCR systems. The first involves particulate removal with the filter or catalyst bed in place. The second involves pulling the filter or catalyst bed out of the fluid pathway and replacing or cleaning it. Both options require shutting down the entire process, an option that is undesirable in the power generation industry, given the time and expense involved in shutting down and restarting a boiler. Therefore, what is needed is a system for removing particulate from filters or catalyst beds, or for refreshing or replacing the catalysts of SCR catalyst beds. Further, what is needed is such a system that may be done without requiring a shutdown of the fluid generation and movement process.

SUMMARY OF THE INVENTION

The present invention is a retractable system insertable into, and removal from, a fluid pathway without a complete shutdown of the process associated with the fluid pathway. The retractable system includes one or more frames into which a filter component or components may be installed. The frame may be of a modular configuration to allow for a partial retraction of the frame unit and replacement or cleaning of those filters subject of the retraction. The frame unit may be arranged in a rail that allows for controlled movement of the frame into and out of the fluid pathway. Alternatively, the frame unit may be on a spindle or conveyor for retraction and reinsertion.

In one aspect of the invention, a system is provided for filtering particles in a fluid under transfer inside a duct, the removable filter system being capable of insertion into, or removal from, the duct without halting fluid transfer through the duct, the removable filter system comprising a filter frame including one or more filter components, and a movement assembly including a drive mechanism, a linkage coupled to the drive mechanism and attached to the filter frame, and means for the filter frame to move into and out of the duct upon actuation of the drive mechanism. The means for the filter frame to move into and out of the duct includes a first stationary rail and a second stationary rail affixable to the inside of the duct and slidingly engageable with the filter frame such that, upon actuation of the drive mechanism, the filter frame slides on the first stationary rail and the second stationary rail. The filter frame includes a first channel and a second channel forming a portion of its perimeter, wherein the first channel is designed to retain therein the first stationary rail and the second channel is designed to retain therein the second stationary rail. The filter frame may optionally include a plurality of bays and wherein each of the plurality of bays is arranged to retain therein one of the one or more filter components. The plurality of bays may be rigidly, hingedly, or detachably connected together. The first stationary rail, the second stationary rail, or both may include a plurality of air jets to provide an air cushion at the location of the duct where the filter frame enters and exits the duct. The drive mechanism may be a guillotine damper gate drive, a hydraulic actuator, a spindle arrangement, a worm gear mechanism, a rack and pinion arrangement, a cable and capstan arrangement, a chain and sprocket drive, or a ball screw mechanism.

In another aspect of the invention, a removable retainer system is provided for retaining a material in a fluid under transfer inside a chamber, the removable retainer system being capable of insertion into, or removal from, the chamber without halting fluid transfer through the chamber, the removable retainer system comprising a retainer including one or more material retaining beds, and a movement assembly including a drive mechanism, a linkage coupled to the drive mechanism and attached to the retainer, and means for the retainer to move into and out of the chamber upon actuation of the drive mechanism. The means for the retainer to move into and out of the chamber includes a first stationary rail and a second stationary rail affixable to the inside of the chamber and slidingly engageable with the retainer such that, upon actuation of the drive mechanism, the retainer slides on the first stationary rail and the second stationary rail. The retainer also includes a first channel and a second channel forming a portion of its perimeter, wherein the first channel is designed to retain therein the first stationary rail and the second channel is designed to retain therein the second stationary rail. The retainer optionally includes a plurality of beds and wherein each of the plurality of beds is arranged to retain therein one of the one or more catalysts. The plurality of beds may be rigidly, hingedly, or detachably connected together. The first stationary rail, the second stationary rail, or both may include a plurality of air jets to provide an air cushion at the location of the chamber where the retainer enters and exits the chamber. The drive mechanism may be a guillotine damper gate drive, a hydraulic actuation system, a spindled arrangement, a worm gear system, a rack and pinion arrangement, a cable and capstan arrangement, a chain and sprocket drive, or a ball screw system.

The details of one or more examples related to the invention are set forth in the accompanying drawings and the description below. Other features, objects, and advantages of the invention will be apparent from the description and drawings, and the appended claims.

DETAILED DESCRIPTION OF PREFERRED EMBODIMENTS OF THE INVENTION

A removable screen system 10 of the present invention is illustrated in the accompanying drawings. The removable screen system 10 is deployed in one or more locations as an improvement to a fluid transfer arrangement, such as the fluid transfer arrangement associated with a power generation system 100 shown in a simplified form in FIG. 1. The screen system 10 is used to move one or more particulate filters and/or one or more retaining beds into and out of one or more fluid pathways of the power generation system 100. While the removable screen system 10 is shown and described herein the context of the power generation system 100, it may also be used in other fluid transfer arrangements in which particulates are to be filtered out of the fluid, or a material is to be retained in the fluid pathway, and there is an interest in minimizing the impact on the operating system to change out or otherwise maintain the applicable filter or bed.

Figure 1:
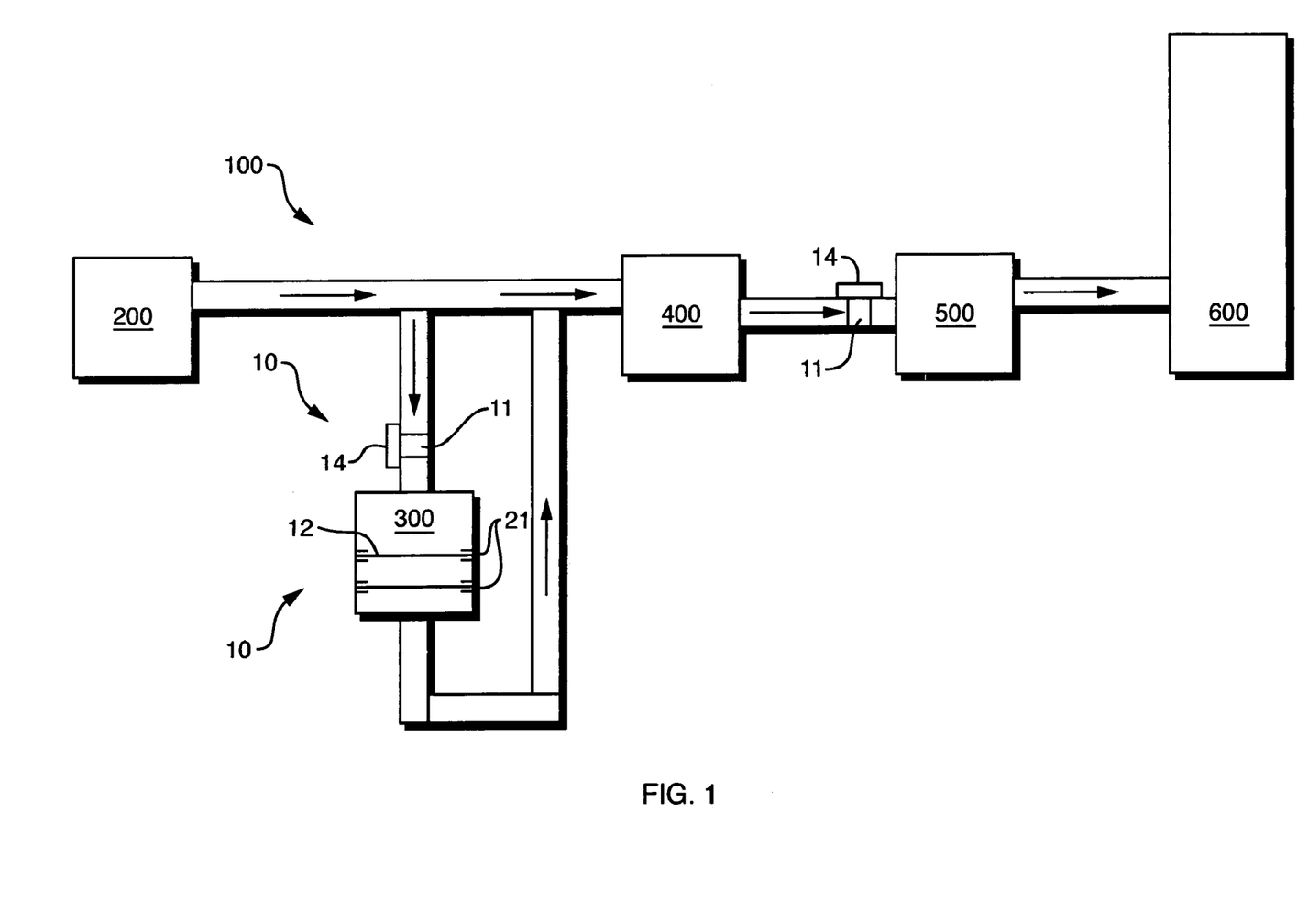
FIG. 1 is a simplified schematic representation of a portion of a power generation system including a boiler, a turbine, a Selective Catalytic Reduction (SCR) reactor, a pre-heater, a precipitator, and an exhaust stack, the system including one or more removable particle filters and one or more removable SCR reactor catalyst beds of the present invention.

The portion of the power generation system shown in FIG. 1 includes a boiler 200, an SCR reactor 300, a preheater unit 400, a precipitator 500, and an exhaust stack 600, as well as one or more removable particle filters 11 and one or more removable retainers 12, either of which units may independently be the removable screen system 10 or form a portion of the removable screen system 10. In the power generation system 100, the boiler 200 is used to create steam at very high temperature and pressure. The steam is directed to one or more turbines coupled to one or more generators. Combustible fuels such as coal, gas, oil, etc., are burned in the boiler 200 to generate the steam. The byproducts of combustion are boiler exhaust gases. The boiler exhaust gases that exit the boiler 200 include hazardous materials such as, but not limited to, solid particles, and nitrogen- and sulfur-containing gases. The boiler exhaust gas is preferably first used to preheat ambient air moving into the boiler 200 at preheater 400. The spent boiler exhaust gas is then removed from the power generation system 100 entirely, such as by venting to the atmosphere. Prior to its exhausting from the power generation system 100, however, the boiler exhaust gas must be treated to remove a defined portion of the hazardous materials contained therein.

With continuing reference to FIG. 1, the boiler exhaust gas moves from the boiler 200 either directly to the preheater unit 400, or first to the SCR reactor 300 for NOx gas reduction and then from there to the preheater unit 400. The spent boiler exhaust gas is next transferred from the preheater unit 400 to the precipitator 500 for fine solids removal. The spent and cleaned boiler exhaust gas is then vented to the atmosphere through the exhaust stack 600. It is to be understood that additional units and processes may form part of the power generation system 100, such as, for example, a heat recovery steam generator and/or a flue gas desulfurization unit (not shown). In all cases, suitable ducting is required to effect the transfer of the high-temperature boiler exhaust gas through the power generation system 100. Diversion devices such as louver dampers, guillotine dampers, and flap dampers are used to direct the flow of the boiler exhaust gas through the power generation system 100. The diversion devices and the various units of the power generation system 100, including the SCR reactor 300, may be adversely affected by solid particles entrained in the boiler exhaust gas. The removable screen system 10 of the present invention aids in the process of removing those solid particles from the boiler exhaust gas.

Figure 2:
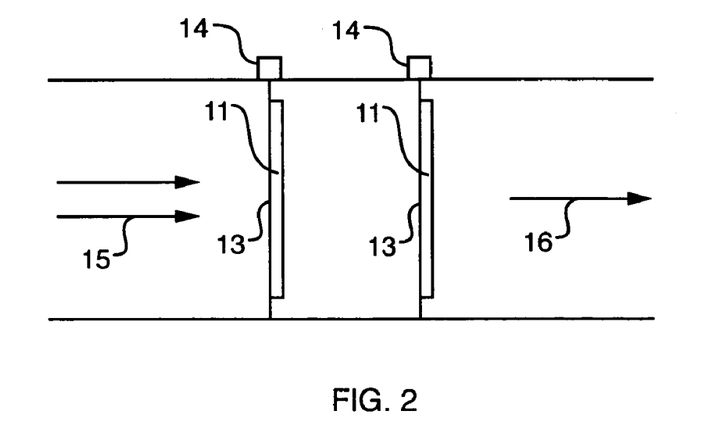
FIG. 2 is a simplified side view of a duct including a removable particle filter of the present invention.

As illustrated in FIGS. 1 and 2, the removable filter 11 of the present invention includes one or more filtering components 13 designed to allow the boiler exhaust to pass through while blocking passage of solid particles. The size of the particle blocked is dependent upon the openings of the filtering component 13. The filtering component 13 may be convoluted, curved or flat in the removable filter 11, dependent upon the angle of impingement of the fluid being filtered. A single filter 11 may be positioned at one or more locations before or after the SCR reactor 300, before or after the preheater 400, before or after the precipitator 500 or any combination thereof. The filter 11 may comprise a plurality of removable filters 11 spaced serially through the duct, as shown in FIG. 2. The filtering component 13 of the filter 11 may have uniformly sized openings or variably sized openings, with the variable-sized openings randomly distributed or distributed in an organized pattern. If a plurality of filters 11 are placed in serial combination, their respective filtering components 13 may be of the same configuration, some the same and some different, or all different. One example of a filtering component 13 suitable to filter boiler exhaust gas is a convoluted screen available from STEAG of Germany.

In operation, unfiltered boiler exhaust gas 15 including solid particles passes through the filtering component 13 as filtered boiler exhaust gas 16, with the solid particles blocked by the filtering component 13, dependent upon their size. The removable filter 11 includes a filter movement assembly 14 to be described further herein. The filter movement assembly 14 permits insertion and removal of the filter 11 into and out of the duct without requiring a shutdown of the power generation operation. Prior boiler exhaust gas filters required operation shutdown for filter maintenance.

Figure 3:
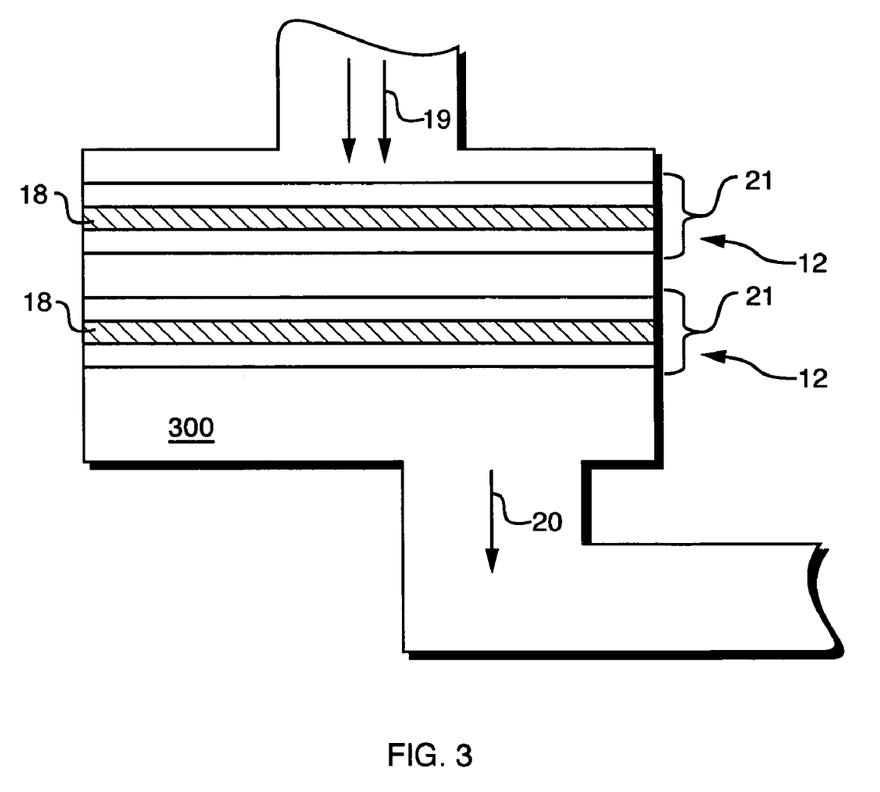
FIG. 3 is a simplified side view of the SCR reactor with a removable retainer of the present invention.

As illustrated in FIGS. 1 and 3, the removable retainer 12 may be used to hold something in place in the flow path. While described herein as a catalyst retainer of the SCR reactor 300, it is to be understood that the retainer 12 may be used to hold in place in a fluid pathway any material of interest. The retainer 12 includes a retainer bed 17 for retaining thereon a material such as a catalyst 18. The retainer bed 17 may be honeycombed, a plate with slots, or some other arrangement suitable for retaining the catalyst thereon while allowing untreated boiler exhaust gas 19 to contact the catalyst 18 and pass through it as treated boiler exhaust gas 20. As shown in FIGS. 1 and 3, a plurality of retainers 12 may be deployed in the SCR reactor 300. Alternatively, one may be used. The retainer 12 may comprise a plurality of removable catalyst beds 17 placed adjacent to one another. The catalyst bed 17 may have uniformly sized openings or variably sized openings, with the variable-sized openings randomly distributed or distributed in an organized pattern. If a plurality of retainers 12 are placed in serial combination, their respective catalyst beds 17 may be of the same configuration, some the same and some different, or all different.

Over time, the catalyst 18 becomes fouled or worn and must be cleaned and/or repaired in order to maintain the effectiveness of the SCR reactor 300, or preheater 400. The present invention includes a removable SCR catalyst bed movement assembly 21, to be described further herein, to permit a portion or all of the catalyst bed 17 to be removed from the fluid pathway without shutting down the gas flow. Prior art SCR arrangements required shutdown of at least the SCR and possibly the entire power generation operation for maintenance of the bed. The removable retainer 12 of the present invention eliminates that requirement.

Figure 4:
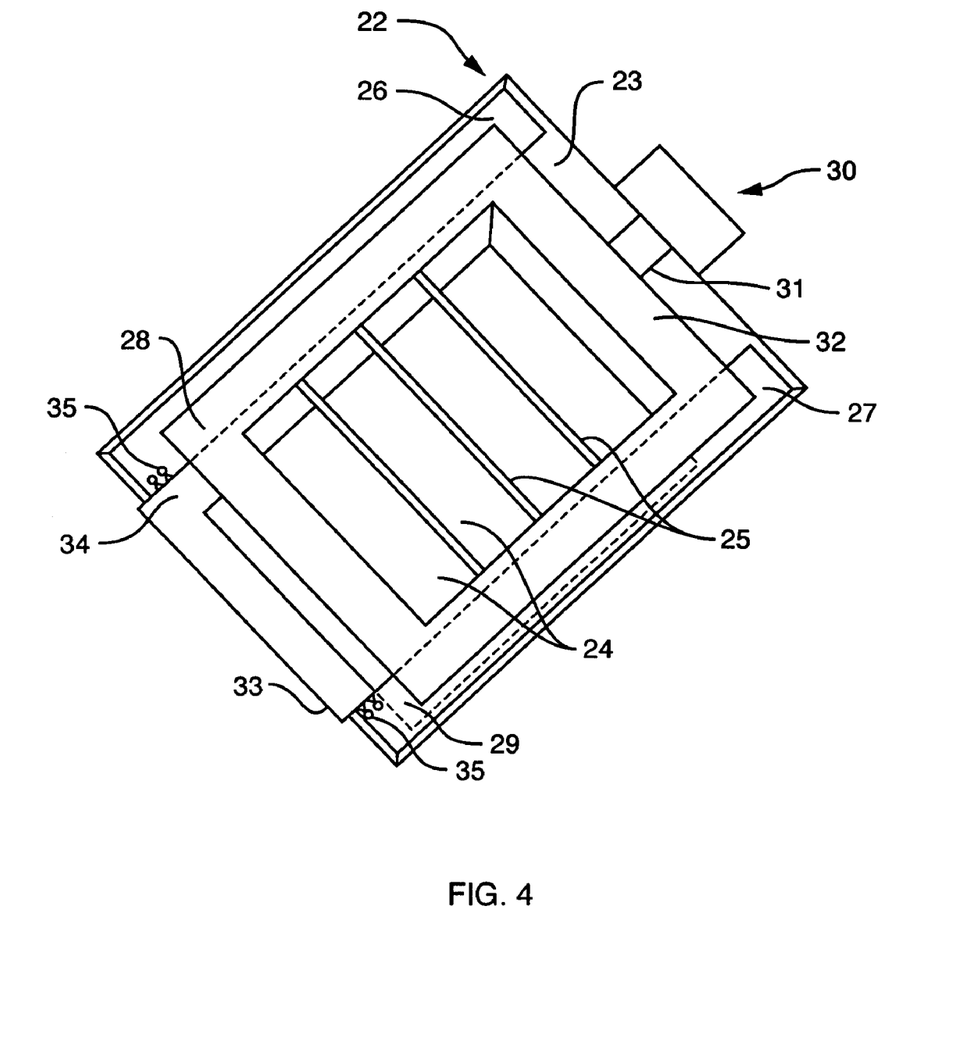
FIG. 4 is a perspective view of a first embodiment of the mechanism for moving the removable filter or bed into and out of the fluid pathway.

As illustrated in FIG. 4, a first movement assembly 22 may be used as the filter movement assembly 14 or the retainer movement assembly 21. The movement assembly 22 is designed to operate in combination with frame 23 forming a part of filter 11 or retainer 12 as desired. The frame 23 includes one or more frame bays 24 for retaining therein either the filtering component 13 or the catalyst bed 17. The shape and dimensions of the frame 24 are dependent upon the inside dimensions of the duct or reactor within which the frame 23 is positioned. The frame 23 further may include one or more frame lands 25 functioning as intermediate support bars upon partial withdrawal of the frame 23 from the fluid pathway. The lands 25 may be hinged to permit individual bays 24 to be folded inwardly or downward upon exiting the duct within which the frame 23 functions. That may be of particular use when the access space around the duct is limited, or for ease of removal of filter or retainer from individual ones of the bays.

The first movement assembly 22 includes a first rail 26 and a second rail 27 sized and arranged to fit in channels 28 and 29 of frame 23 for slidable movement of the frame 23 thereon. The first rail 26 and the second rail 27 are preferably affixed at a first end and a second end thereof to the inside of the duct through which the fluid passes. The first movement assembly 22 further includes a drive mechanism 30 with a linkage 31 attached to the frame 23 at a first end 32 thereof. The drive mechanism may be a guillotine slide gate mechanism of the type employed to move guillotine dampers into and out of fluid pathways in power generation systems. Examples of commercially available drive mechanisms include "Rack and Pinion" drives as supplied by Bachmann Industries, Inc. or "Chain and Sprocket" drives as supplied by Effox, Inc. Upon actuation of the drive mechanism 30 in a first direction, the frame 23 slides along the rails 26 and 27 out of a duct port 33 until stopped by stoppage of the drive mechanism 30. The drive mechanism 30 is preferably capable of control for stoppage at intermediate positions, such as when the frame lands 25 reach the duct port 33. Any filter positioned within a frame bay 24 moved outside of the duct by actuation of the drive mechanism 30 in the first direction may be removed for replacement, cleaning or repair, or it may be processed in situ. Replacement may be the preferred option as it may require the shortest amount of time to have the filter 11 or retainer 12 partially or completely out of the duct. Reversing the direction of movement of the drive mechanism 30 moves the frame 23 back into the duct.

The frame 23 and the rails 26 and 27 are configured to establish a sealing fit within the duct. The rails 26 and 27 optionally include at a second end 34 thereof a plurality of air jets 35 coupled to an air supply. The air jets 35 are used to direct a cushion of air around the perimeter of the frame 23 to prevent the boiler exhaust gas from exiting the duct port 33 when the frame is being moved into or out of the duct. Alternatively or in addition, a movable door may be used to seal off the duct port 33 when the frame 23 is either completely in or out of the duct. A means for establishing the air cushion and the sealing fit are described in U.S. Pat. No. 6,116,264 entitled DUAL DAMPER DIVERTER, issued on Sep. 12, 2000, to Bachmann et al. The entire content of that patent is incorporated herein by reference.

Figure 5:
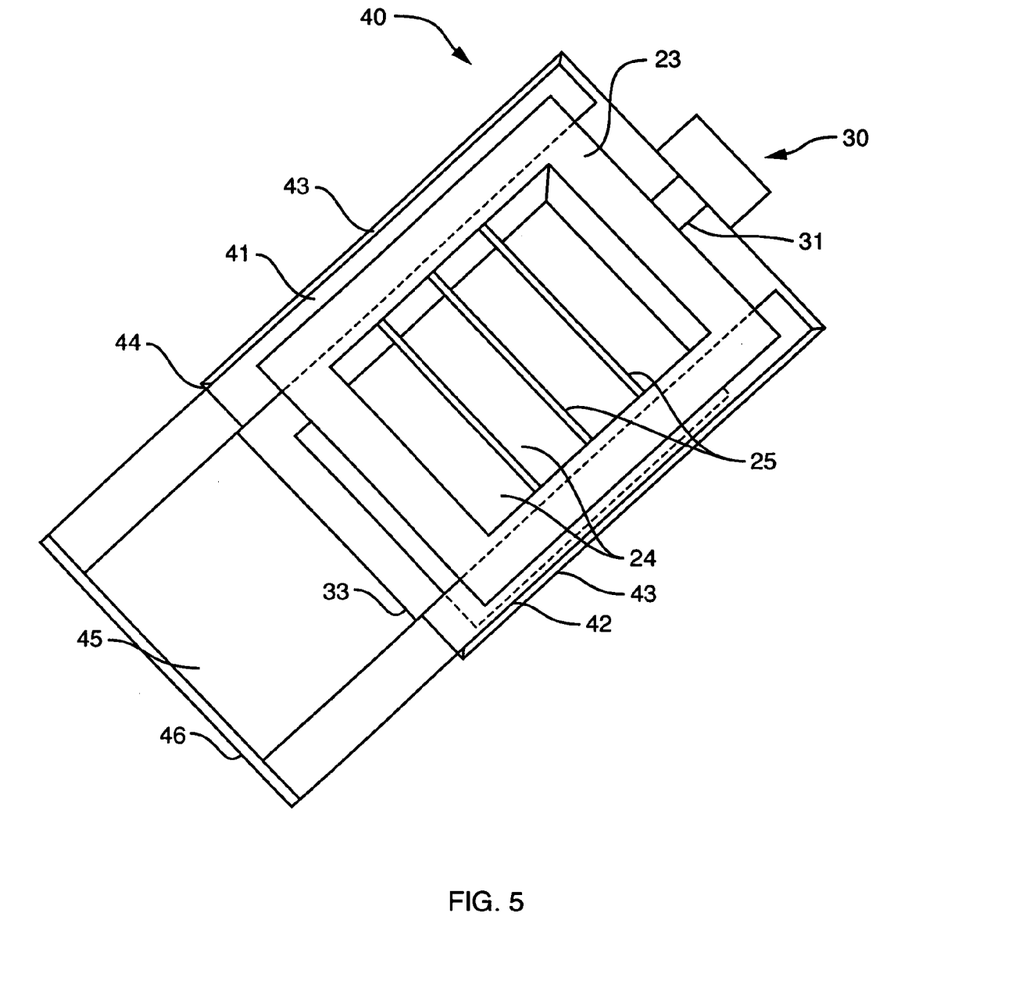
FIG. 5 is a perspective view of a second embodiment of the mechanism for moving the removable filter or bed into and out of the fluid pathway.

As illustrated in FIG. 5, a second movement assembly 40 may be used as the filter movement assembly 14 or the retainer movement assembly 21. The second movement assembly 40 is designed to operate in combination with frame 23 forming a part of filter 11 as desired. The configuration of the frame 23 of FIG. 5 is the same as the frame of FIG. 4 and includes attachment to the drive mechanism 30 through linkage 31. The second movement assembly includes a first rail 41 and a second rail 42. The first rail 41 and the second rail 42 are preferably affixed at a first end and a second end thereof to the inside of the duct 43 through which the fluid passes, and extend through the duct wall 44 to an area outside of the duct 43. The first rail 41 and the second rail 42 are joined together at a first end 45 thereof by rail bar 46. The rail bar 46 is preferably a channel, tube, angle, or other type of structure that extends above the plane of the space defined by the sliding surfaces of the first and second rails 41 and 42. That arrangement ensures that as the frame 23 is moved out of the duct 43, the rail bar 46 will act as a stop block.

With continuing reference to FIG. 5, in operation, actuation of the drive mechanism 30 in a first direction, slides the frame 23 along the rails 41 and 42 out of duct port 33 until stopped by stoppage of the drive mechanism 30, or upon reaching the rail bar 46. The drive mechanism 30 is preferably capable of control for stoppage at intermediate positions, such as when the frame lands 25 reach the duct port 33. Any filter or retainer positioned within a frame bay 24 moved outside of the duct by actuation of the drive mechanism 30 in the first direction may be removed for replacement, cleaning or treatment, or it may be processed in situ in the bay 24. Replacement may be the preferred option as it may require the shortest amount of time to have the filter 11 partially or completely out of the duct 43. Reversing the direction of movement of the drive mechanism 30 moves the frame 23 back into the duct 43. The movement of the frame 23 into and out of the duct may be achieved in a sealing manner using the air jets and/or sealing door as described with reference to FIG. 4.

Figure 6:
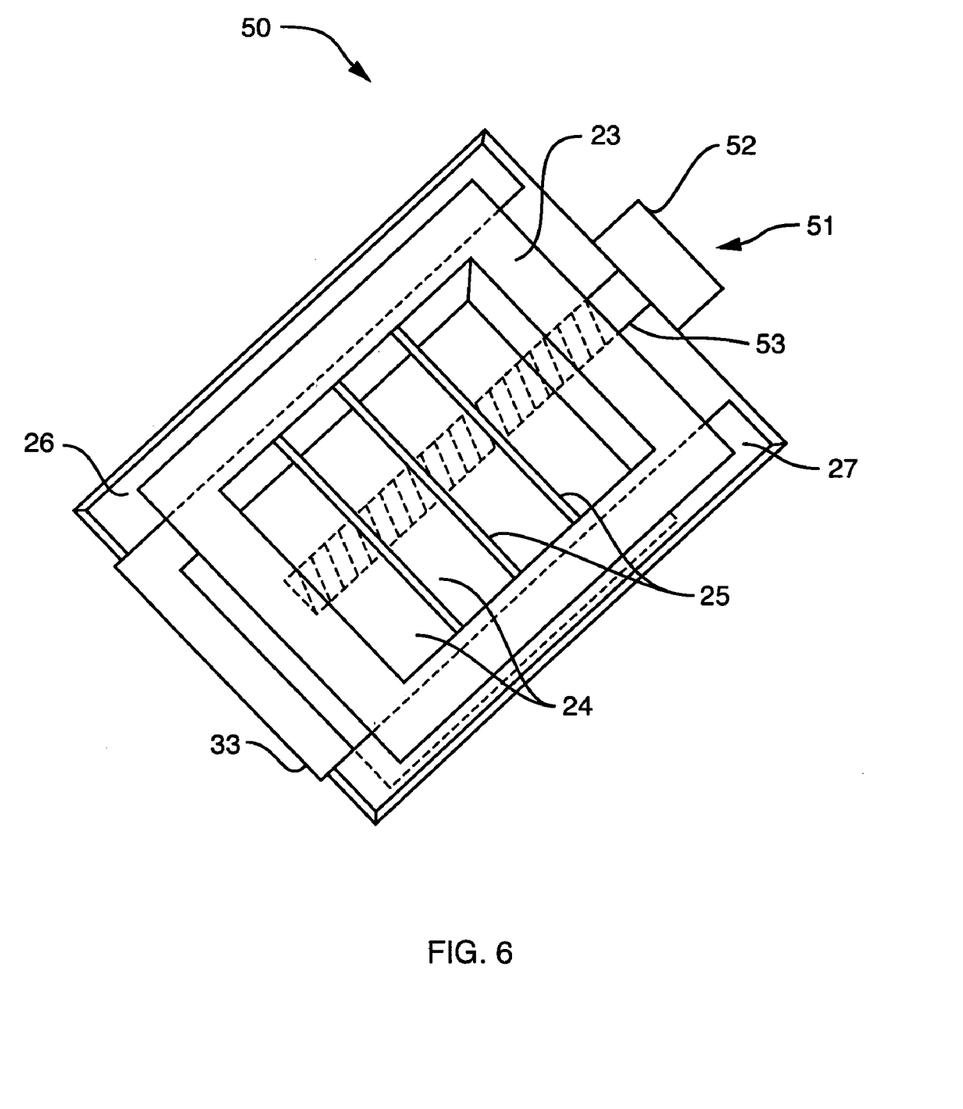
FIG. 6 is a perspective view of a third embodiment of the mechanism for moving the removable filter or bed into and out of the fluid pathway.

As illustrated in FIG. 6, a third movement assembly 50 may be used in combination with the frame 23 and the first rail 26 and second rail 27. A second drive mechanism 51 includes a spindle 52 and a spindle actuator 53. The spindle 52 may be a spindle of a worm gear or a ball screw assembly. The spindle 52 may also be arranged as part of a hydraulic drive ram assembly. The spindle 52 is preferably sealing attached to the frame 23 and extending completely or substantially through the center thereof, passing through one or more lands 25 when such lands extend substantially or completely through from one face to the other face of the frame 23. The spindle 52 must be arranged in combination with the frame 23 such that the bays 24 may be readily accessed to clean or remove and re-insert the filter 11. That may be achieved by affixing the filter or frame within the bay 24 above the rotatable spindle 52 but within the dimensions of the frame 23. It is to be noted that the second drive mechanism 51 may alternatively used with the rail arrangement of FIG. 5.

With continuing reference to FIG. 6, in operation, actuation of the second drive mechanism 51 in a first direction, slides the frame 23 along the rails 26 and 27 out of duct port 33 until stopped by stoppage of the drive mechanism 51, or upon reaching the rail bar 46 of FIG. 5 if that rail arrangement is used instead. The drive mechanism 51 preferably includes a controller for regulated movement of the frame 23 partially or completely out of the duct port 33. Any filter positioned within a frame bay 24 moved outside of the duct by actuation of the drive mechanism 51 in the first direction may be removed for replacement, cleaning or repair, or it may be processed in situ in the bay 24. Reversing the direction of movement of the drive mechanism 51 moves the frame 23 back into the duct. The movement of the frame 23 into and out of the duct may be achieved in a sealing manner using the air jets and/or sealing door as described with reference to FIG. 4.

Figure 7:
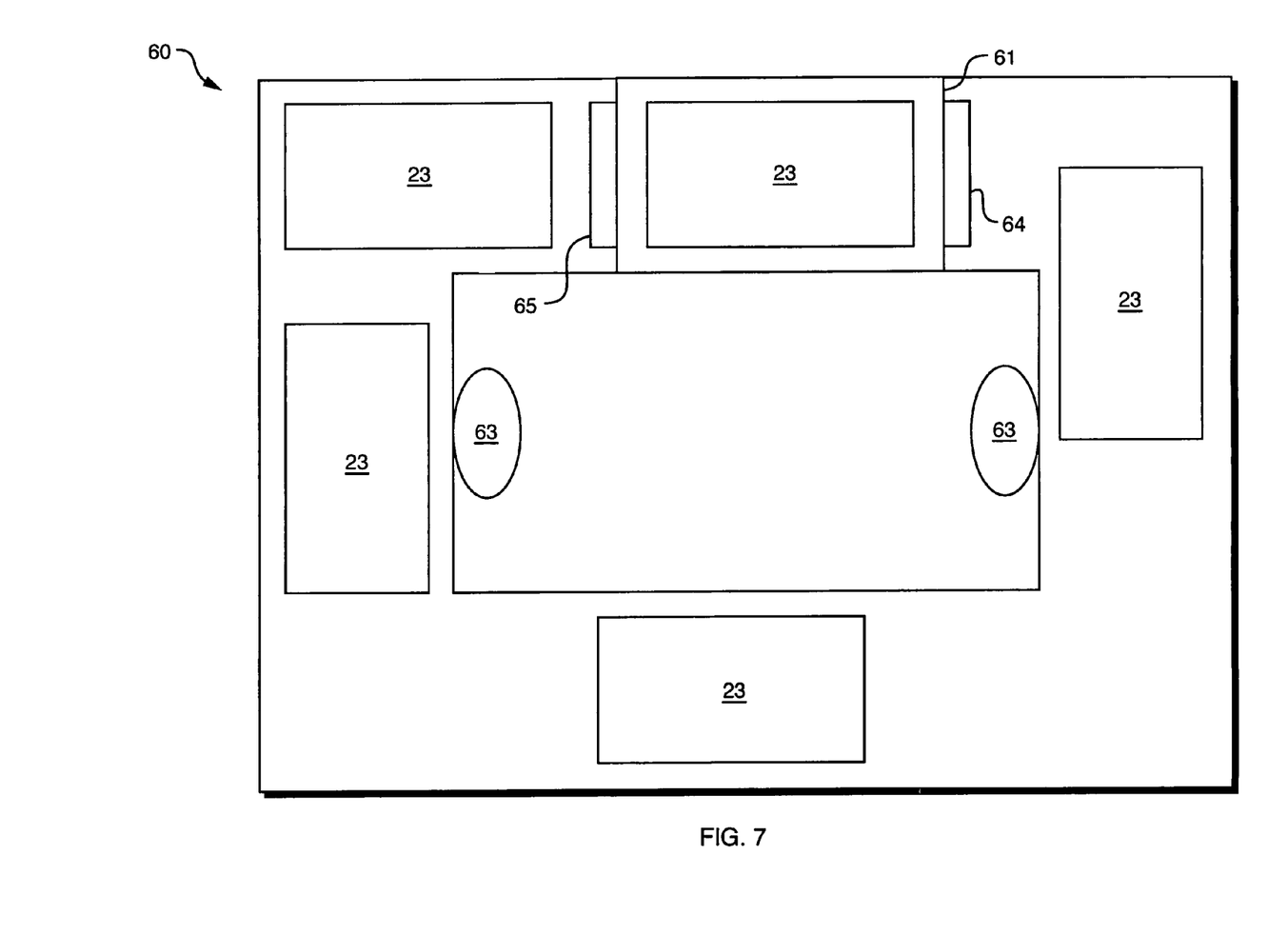
FIG. 7 is a side view of a fourth embodiment of the mechanism for moving the removable filter or bed into and out of the fluid pathway.

FIG. 7 shows a fourth movement assembly 60 arranged as a conveyor assembly for moving the frame 23 into out of a duct 61. The fourth movement assembly 60 includes a movable link system 62 to which one or more frames 23 may be removably attached, and a set of pulleys 63 affixed to the belt 62. Actuation of the drive assembly 63 causes movement of the link system 62 and the frames 23 on the link system 62. The frames may be moved in and out of the duct 61 through a first duct port 64 and a second duct port 65.

Each of the duct ports 64 and 65 preferably includes some form of sealing arrangement such as, but not limited to, the air jets and/or sealing door as noted with reference to FIG. 4. The frames 23 may have a single bay or a plurality of bays including the filter as previously described. The frames may be separately affixed to the belt 62 or they may be linked together such as with pins on the sides thereof.

With continuing reference to FIG. 7, in operation, any frame 23 within the duct 61 may be moved out of the duct 61 by causing actuation of the drive assembly 63 and corresponding movement of the link system 62. When a frame 23 passes out of the duct 61, such as via duct port 64, and its filter may be cleaned or revitalized while remaining on the link system 62. Alternatively, the filter may be removed from the frame 23, replaced with a new or revitalized filter or belt, and the frame 23 allowed to continue its passage back into the duct 61 via second duct port 65 as needed.

The combination of the frame 23 and any of the frame movement assemblies described herein provide an effective means for quickly maintaining a filter medium used in a fluid pathway for fluid treatment. That maintenance may be accomplished without shutting down the operation of the system generating the fluid under treatment. The frame 23 may be a unitary structure or fabricated in a modular way. It may include a single bay for holding therein a filter or retaining bed. Alternatively, the frame 23 may include a plurality of bays. If a plurality of bays is used, individual compartments may retain therein filters of differing capabilities, such as filter media of different pore sizes or impingement angles. The individual bays may be rigidly or detachably connected together. They may be hingedly or jointedly connected together. The frame may be configured as a butterfly structure capable of being folded upon itself and then removed from its duct for maintenance. Such an arrangement may be suitable for round-duct filters or retainers, or in locations where access to the duct is substantially confined and space to effect the frame movement is restricted.

The drive mechanism may be employed to rotate or tilt the frame 23 within the duct as well as move it in and out of the duct. The drive mechanism may be controlled for periodic movement of the frame 23 within or into or out of the duct. A control means for the drive mechanism may be coupled to one or more sensors associated with conditions within the duct or on the filter or retainer held by the frame 23. The sensors may detect pressure changes, velocity changes, or any other characteristic that may be relevant to the function of the frame or the process associated with the fluid movement. For a modular frame arrangement, such sensors may detect pressure changes, velocity changes, or the like associated with individual bays. Specific filters or retainers could then be repaired or moved in some manner to optimize system functions.

It is to be understood that the system 10 may be employed with other forms of fluid diversion arrangements including, but not limited to, water and other liquid movement systems, chemical process systems, and any form of gas flow systems, including over a wide range of temperature conditions. The materials used to fabricate the various components of the system 10 may be selected as a function of the particular operation within which it is deployed. However, non-corrosive, high temperature metals, such as stainless steel, or, alternatively, abrasion resistant materials, may be preferred in environments such as power generation systems.

While the present invention has been described with particular reference to certain embodiments of the removable screen system, it is to be understood that it includes all reasonable equivalents thereof as defined by the following appended claims.

What is claimed is:

1. A system for filtering particles out of a fluid under transfer, the system comprising:
   a) a duct arranged to allow the fluid to pass therethrough, wherein an inside of the duct includes a first stationary rail and a second stationary rail;
   b) a filter frame including one or more filter components retained therein, wherein the filter frame includes a first channel arranged for slidable movement on the first stationary rail of the duct and a second channel arranged for slidable movement on the second stationary rail of the duct, and wherein the first stationary rail and the second stationary rail are arranged such that when the filter frame is positioned within the duct, the fluid passes through the one or more filter components; and
   c) a drive mechanism and a linkage arranged to coupled the drive mechanism to the filter frame, wherein the drive mechanism and the linkage move the filter frame into and out of the duct upon actuation of the drive mechanism,
   wherein the duct includes means to establish a sealing fit between the inside of the duct and the filter frame such that the filter frame moves into and out of the duct without halting the transfer of fluid through the duct.

2. The system as claimed in claim 1 wherein the filter frame includes a plurality of bays and wherein each of the plurality of bays is arranged to retain therein one of the one or more filter components.

3. The system as claimed in claim 2 wherein the filter frame includes one or more lands separating each of the plurality of bays.

4. The system as claimed in claim 3 wherein the plurality of bays is rigidly connected together at the one or more lands.

5. The system as claimed in claim 3 wherein the plurality of bays is hingedly connected together at the one or more lands.

6. The system as claimed in claim 3 wherein the plurality of bays is detachably connected together at the one or more lands.

7. The system as claimed in claim 1 wherein at least one of the first stationary rail and the second stationary rail of the inside of the duct includes a plurality of air jets such that the means to establish a sealing fit is an air cushion provided by the air jets at the location of the inside of the duct where the filter frame enters and exits the duct.

8. The system as claimed in claim 1 wherein the drive mechanism is a guillotine damper gate drive.

9. The system as claimed in claim 1 wherein the linkage is a spindle connected to the filter frame.

10. The system as claimed in claim 1 wherein the linkage is a rack and pinion and the drive mechanism is a worm gear actuator.

11. The system as claimed in claim 1 wherein the linkage is a ball screw assembly and the drive mechanism is a ball screw actuator.

12. The system as claimed in claim 1 wherein the drive mechanism and linkage in combination is a hydraulic actuator.

13. A system for maintaining a catalyst bed arranged to contact a fluid under transfer, the system comprising:

a) a duct arranged to allow the fluid to pass therethrough, wherein an inside of the duct includes a first stationary rail and a second stationary rail;

b) a retainer frame including one or more catalyst retainers thereof for retaining catalyst therein, wherein the retainer frame includes a first channel arranged for slidable movement on the first stationary rail of the duct and a second channel arranged for slidable movement on the second stationary rail of the duct, and wherein the first stationary rail and the second stationary rail are arranged such that when the retainer frame is positioned within the duct, the fluid passes through the catalyst; and c) a drive mechanism and a linkage arranged to couple the drive mechanism to the retainer frame, wherein the drive mechanism and the linkage move the retainer frame into and out of the duct upon actuation of the drive mechanism, wherein the duct includes means to establish a sealing fit between the inside of the duct and the retainer frame such that the retainer frame moves into and out of the duct without halting the transfer of fluid through the duct.

14. The system as claimed in claim 13 wherein at least one of the first stationary rail and the second stationary rail of the inside of the duct includes a plurality of air jets such that the means to establish a sealing fit is an air cushion provided by the air jets at the location of the inside of the duct where the retainer frame enters and exits the duct.

15. The system as claimed in claim 13 wherein the drive mechanism is a guillotine damper gate drive.

16. The system as claimed in claim 13 wherein the linkage is a spindle connected to the retainer frame.

17. The system as claimed in claim 13 wherein the linkage is a rack and pinion and the drive mechanism is a worm gear actuator.

18. The system as claimed in claim 13 wherein the linkage is a ball screw assembly and the drive mechanism is a ball screw actuator.

19. The system as claimed in claim 13 wherein the drive mechanism and linkage in combination is a hydraulic actuator.

20. The system as claimed in claim 13 wherein the retainer frame includes a plurality of catalyst beds including uniform or variable size openings.

* * * * *